United States Patent [19]
Schreiber et al.

[11] Patent Number: 5,430,876
[45] Date of Patent: * Jul. 4, 1995

[54] REMOTE PROCEDURE CALLBACK SYSTEM AND METHOD

[75] Inventors: Benn L. Schreiber, Issaquah, Wash.; Robert Bismuth, Harvard, Mass.; Claire R. Cockcroft, Redmond, Wash.; Mark C. Ozur, Boulder, Colo.; Dennis J. Doherty, Redmond, Wash.

[73] Assignee: Digital Equipment Corporation, Maynard, Mass.

[ * ] Notice: The portion of the term of this patent subsequent to Sep. 28, 2010 has been disclaimed.

[21] Appl. No.: 81,970

[22] Filed: Jun. 24, 1993

Related U.S. Application Data

[63] Continuation-in-part of Ser. No. 982,415, Nov. 27, 1992, Pat. No. 5,249,293, and a continuation-in-part of Ser. No. 830,730, Feb. 4, 1992, Pat. No. 5,247,676, which is a continuation of Ser. No. 374,100, Jun. 29, 1989, abandoned, said Ser. No. 982,415, is a continuation of Ser. No. 372,022, Jun. 27, 1989, abandoned.

[51] Int. Cl.⁶ .............................................. G06F 13/14
[52] U.S. Cl. .................................... 395/650; 364/821; 364/824; 364/833; 364/834; 364/840; 364/843; 364/844; 364/DIG. 1
[58] Field of Search ................................ 395/650, 700

[56] References Cited

U.S. PATENT DOCUMENTS

| | | |
|---|---|---|
| 4,586,134 | 4/1986 | Norstedt . |
| 4,635,189 | 1/1987 | Kendall . |
| 4,644,468 | 2/1987 | Doster et al. . |
| 4,679,191 | 7/1987 | Nelson et al. . |
| 4,698,757 | 10/1987 | Dill et al. . |
| 4,701,848 | 10/1987 | Clyde . |
| 4,714,996 | 12/1987 | Gladney et al. . |
| 4,800,488 | 1/1989 | Agrawal et al. . |
| 4,809,170 | 2/1989 | Leblang et al. . |
| 4,941,089 | 7/1990 | Flecher . |
| 4,949,248 | 8/1990 | Caro . |
| 5,001,628 | 3/1991 | Johnson et al. . |
| 5,050,070 | 9/1991 | Chastain et al. . |
| 5,063,500 | 11/1991 | Shorter et al. . |
| 5,187,790 | 2/1993 | East et al. ............................ 395/650 |
| 5,247,676 | 9/1993 | Ozur et al. .......................... 395/650 |
| 5,249,293 | 9/1993 | Schreiber et al. ................... 395/650 |
| 5,307,490 | 4/1994 | Davidson et al. ................... 395/650 |

OTHER PUBLICATIONS

"Implementing Remote Procedure Calls"; Andrew D. Birrell et al.; ACM Transactions on Computer Systems, vol. 2, No. 1, Feb. 1984, pp. 39–59.

"Multi-Thread Host Server For PC Support"; IBM Technical Disclosure Bulletin; vol. 28, No. 9, Feb. 1986, pp. 3848–3855.

Primary Examiner—Kevin A. Kriess
Assistant Examiner—John Q. Chavis
Attorney, Agent, or Firm—Flehr, Hohbach, Test, Albritton & Herbert

[57] ABSTRACT

A method is provided for executing an application on a compute server of a computer network or other computer system that includes the compute server and at least one client system. The client system makes a remote procedure call to the compute server, and the remote procedure call is transported by the computer network or computer system from the client system to the compute server. Execution of the client program that made the remote procedure call is suspended until the compute reserver returns the results of executing the remote procedure call. After the compute server begins processing the remote procedure call it may determine that additional information is needed from the client system to process the remote procedure call. In that case, the compute server initiates a remote procedure callback to the client system to request the required additional information, and that remote procedure callback is transported back to the client system by the computer network. The client system receives and processes the remote procedure callback and returns the requested additional information to the compute server. The compute server can make more than one remote procedure callback to the client system. When the compute server finishes processing the client system's remote procedure call, the results generated by the compute server are sent back to the client system.

4 Claims, 8 Drawing Sheets

REMOTE PROCEDURE CALLBACK SYSTEM AND METHOD

This application is a continuation in part of (A) Ser. No. 07/982,415, filed Nov. 27, 1992, now U.S. Pat. No. 5,249,293, which was a continuation of Ser. No. 07/372,022, filed Jun. 27, 1989, now abandoned, and (B) Ser. No. 07/830,730, filed Feb. 4, 1992, now U.S. Pat. No. 5,247,676, which was a continuation of Ser. No. 07/374,100, filed Jun. 29, 1989, now abandoned.

The present invention relates generally to the use of remote procedure calls to control the execution of application programs on compute servers at the request of client systems, and more particularly to systems and methods for enabling a compute server to successfully execute an application program on behalf of a client system when the original remote procedure call to the compute server does not provide all the information needed by the compute server to perform that function.

BACKGROUND OF THE INVENTION

The use of a high-performance computer system connected to a less powerful client computer system via network hardware and software is well known. The high performance computer system, commonly known as a compute server, typically is used primarily to provide additional computational power to support the client system.

One earlier system for utilizing a computer server with a client system involves batch processing. Programs that run on a client system submit requests to the compute server for it to run computation intensive programs. The compute server executes the programs, and communicates the results back to the client system.

Unfortunately, in batch processing, communication between the client system and a compute server ordinarily is not transparent to a user because, for example, a client system and a compute server typically do not share common access to data sets. Therefore, in batch processing special commands ordinarily must be provided by a user to the client system to initiate batch processing on the compute server.

Consequently, context information required by the compute server to run a program in a batch processing environment generally must be provided to it by the client system prior to a run. User context information, for example, is information that enables, defines or restricts the capabilities of a user in a system. Examples of typical user context information include: location and contents of disk files and user environment variables such as the natural language of the user.

Another earlier system for using a compute server with a client system involves a remote procedure call (RPC) distributed application computer network. In using such a distributed application network, a program is segmented at the time of its development and is implemented in multiple pads, including a part that runs on the compute server and another part that runs on the client system. Ordinarily, subroutines that require the computational power of the compute server are built into the program part that is run on the compute server. Other subroutines and the main program part generally are run on the client system.

A remote procedure call (RPC) is a procedure call in which a called routine executes in a different address space and thread than the calling routine. An RPC ordinarily involves the passing of a message from one address space to another address space. RPCs can be made to a thread in the same computer system or in a remote computer system.

Typically, in a system using such distributed applications, the program part that runs on the client system uses the context of the client system, and the program part that runs on the compute server uses the context of the compute server. If client context information is required in the program part running on the compute server, then a program developer must code such client context into the program at the time of its development.

Unfortunately, since separate program parts run on the client system and the compute server, there often is a relatively high level of network traffic between the client and the server due to the need to transport parameters between program parts on a per call basis. Also, the client system and the compute server generally must run the same operating systems in order to ensure source and data level portability of a program.

Thus, there has been a need for a computer network in which the compute server interface is substantially transparent to the client system user and in which context information can be transparently transported on program request between the client and compute server systems.

Furthermore, there has been a need for such a method in which there is source and data level portability even when the client system and the compute server use different operating systems. The present invention meets these needs.

A callback is a nested RPC in which either a called thread or a helper thread makes an RPC callback to the calling thread. Typically, for example, when a called thread is invoked through an RPC, information that identifies the calling thread is stored in a call block in the address space of the called thread. The identifying information in the call block is used by the present invention to locate the calling thread during callbacks.

In accordance with the present invention, information can be stored in conjunction with a call block to indicate when a callback is in progress. It would be desirable to use the information stored in such call blocks to control the use of RPC callbacks, for example, to delay a callback to the calling thread until another callback by another thread has been completed.

For additional information regarding the state of the art regarding Remote Procedure Calls, reference may be made to "Implementing Remote Procedure Calls," by Andrew D. Birrell and Bruce Jay Nelson, ACM Transactions on Computer Systems, Vol. 2, No. 1, pp. 39–59, February 1984 (ACM 0734-2071/84/0200-0039).

SUMMARY OF THE INVENTION

The invention involves a computer network or other computer system which includes a compute server and a client system and a method for controlling a process that runs on the compute server. More specifically, the method involves the transparent execution of an application program on the compute server with initiation from a client system. The client system makes a remote procedure call to the compute server, and the remote procedure call is transported by the computer network or computer system from the client system to the compute server. Execution of the client program that made the remote procedure call is suspended until the compute reserver returns the results of executing the remote procedure call. After the compute server begins processing the remote procedure call it may determine that additional information is needed from the client system to process the remote procedure call. In that case, the compute server initiates a remote procedure callback to the client system to request the required additional information, and that remote procedure callback is transported back to the client system by the computer network. The client system receives and processes the remote procedure callback and returns the requested additional information to the compute server. The compute server can make more than one remote procedure callback to the client system. When the compute server finishes processing the client system's remote procedure call, the results generated by the compute server are sent back to the client system.

BRIEF DESCRIPTION OF THE DRAWINGS

These and other features and advantages of the present invention will be apparent to those skilled in the art from the following detailed description in conjunction with the appended drawings in which.

These and other features and advantages of the present invention will be more apparent from the following description of an exemplary embodiment thereof, as illustrated in the accompanying drawings.

DETAILED DESCRIPTION OF THE PREFERRED EMBODIMENTS

The present invention comprises a novel method and a novel computer network for controlling an application program that runs on a compute server. The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded the widest scope consistent with the principles and features disclosed herein.

Figure 1:
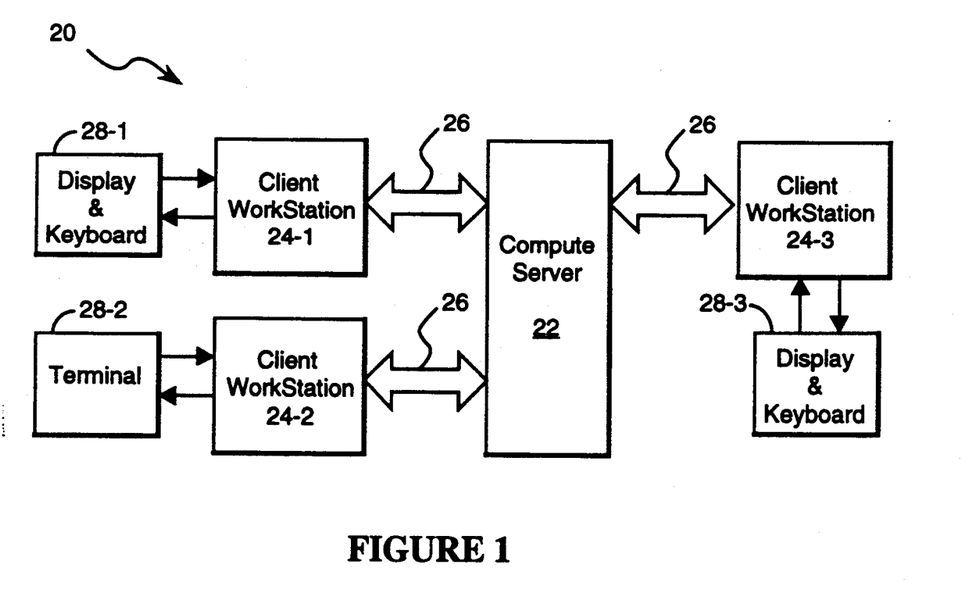
FIG. 1 is a block diagram of a computer network in accordance with the invention.

Referring to the illustrative drawings of FIG. 1, there is shown a block diagram of a computer network 20 in accordance with the present invention. The network includes a compute server 22 connected to multiple client systems 24-1, 24-2 and 24-3 by networking hardware and software 26. The client systems, for example, can be workstations such as client systems 24-1 and 24-3 or can be time share systems such as client system 24-2, each of which possess different address spaces from each other and from the server 22. The client workstations 24-1 and 24-3 are accessed by users through workstation displays and keyboards 28-1 and 28-3. The client time share system 24-2 is accessed by users through a terminal 28-2. In the presently preferred embodiment, the network software and hardware 26 permits peer-to-peer communication between the compute server 22 and the respective client systems. That is, the compute server 22 and each of the client systems possess the same network communications capabilities. The network hardware and software comprises a Remote Procedure Call (RPC) system described more fully below. The compute server typically is a high performance computer system used primarily for its computational power or, for example, it can be a file server used for distributed file access.

The computer network 20 advantageously permits substantially transparent client server access to and control over execution of computation intensive application programs on the compute server. More particularly, the system permits a user to make a request to a client system for application program execution and to have the application program actually execute on the compute server, although to the requesting user, the application program appears to be running on the client system. In order to achieve such transparent operation, the compute server network 20 runs the compute intensive programs, using context information obtained from the client system with which a user interacts. The user context information for a given user on a client system includes a collection of parameters that enable and/or restrict the capabilities of that user within the client system. For example, context information can include: local logical name definitions, file storage and identifiers.

Figure 2:
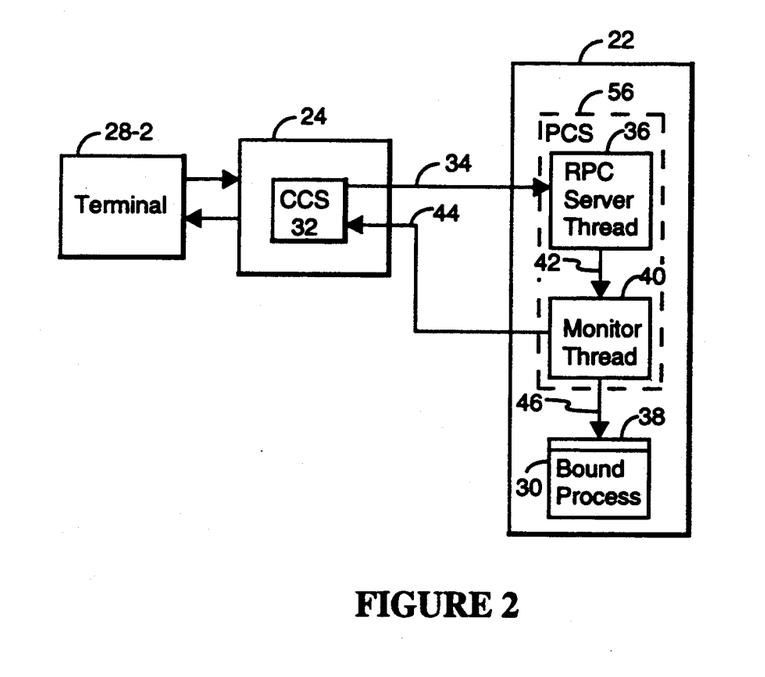
FIG. 2 is a flow diagram illustrating the steps in creating a bound process on the compute server of FIG. 1.

The illustrative flow diagram of FIG. 2 shows the steps used in accordance with the present invention to produce a bound process 30 which executes the application program. In the presently preferred embodiment, a program run on the compute server 22 in response to a user request to a client system executes as a bound process. The program is referred to as bound because its execution lifetime is under the control of a program known as a client context server 32 that runs on the client system 24 that initiates its execution, and because its runtime execution environment reflects context previously established on the client system 24 that requests its execution.

Figure 5A:
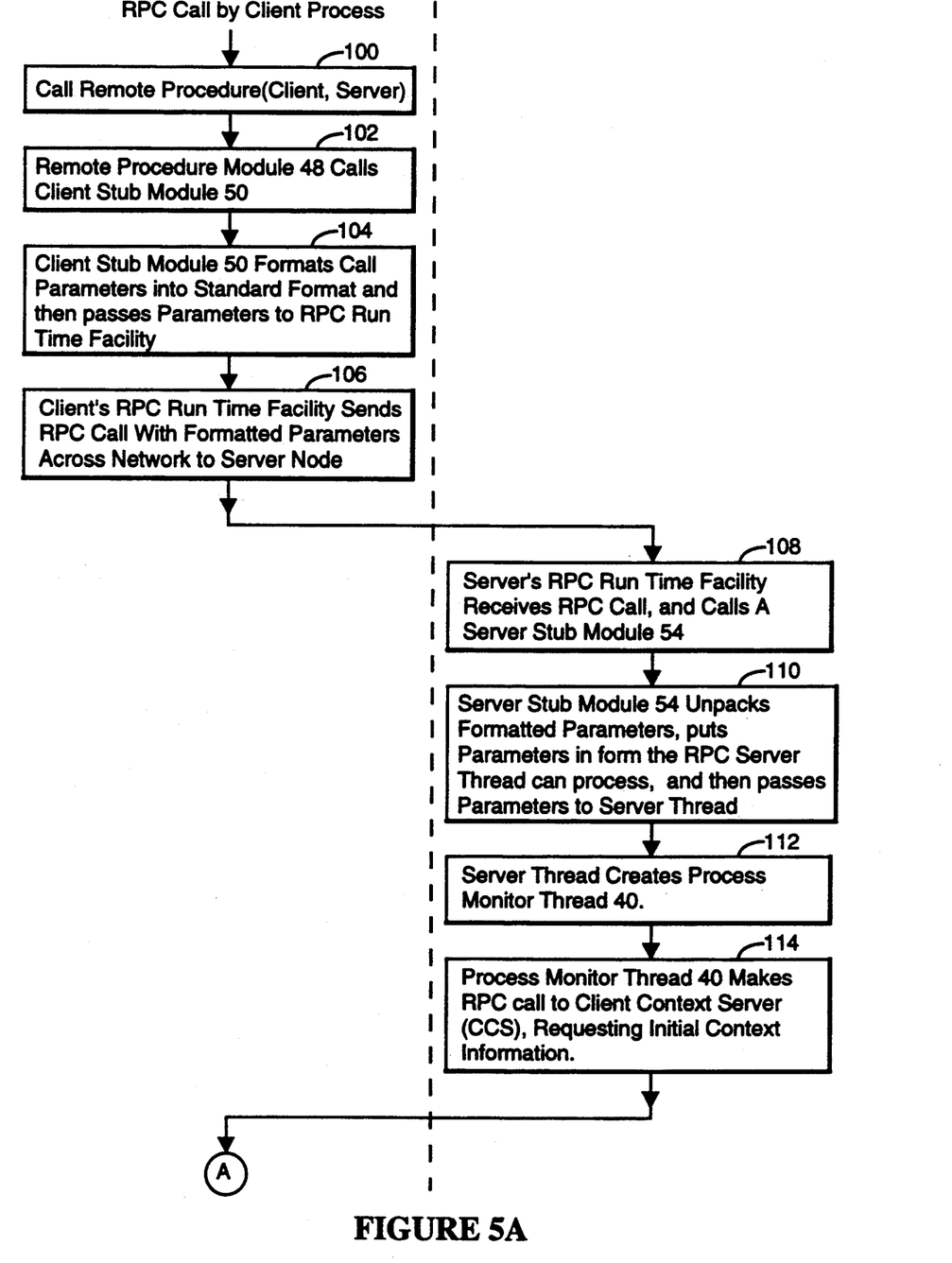
FIGS. 5A and 5B are a flow chart depicting a first embodiment of the method of the present invention.
Figure 5B:
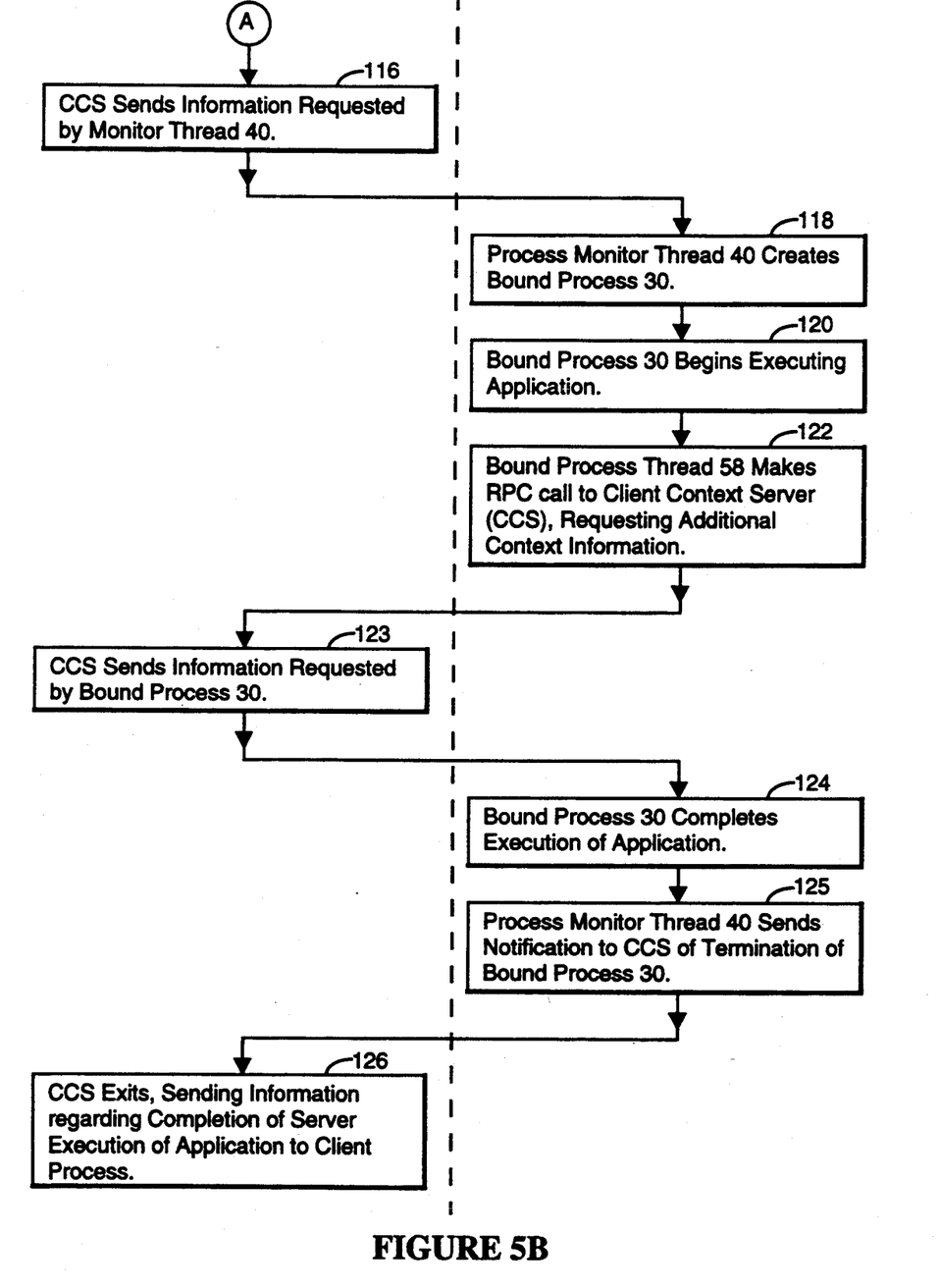

Referring to FIGS. 2, 5A and 5B, in the first step of the procedure, a user provides a request, through terminal 28, that an application program be executed (see box 100 in FIG. 5A). In response to that request, another program, the client context server (CCS) 32 executes on the client system 24. The CCS makes an RPC call, as indicated by arrow 34, to an RPC server thread 36 that runs on the compute server 22. The RPC call indicated by arrow 34 creates the process controller server (PCS) 56 which runs the RPC server thread 36 which allocates a data record 38 for the bound process 30, which at this stage has not yet been fully defined. The RPC server thread 36 also creates a process monitor thread 40 (box 112) by making a system call and passes to it a pointer to the data record 38. The RPC server thread 36 and the monitor thread 40 communicate through the data record 38, as indicated by arrows 64 and 66. The creation of the monitor thread 40 by the RPC server thread 36 is indicated by the arrow 42. After making the RPC call to the RPC server thread 36, the CCS 32 enters a wait mode.

The compute server 22 of the presently preferred embodiment can run multiple threads of execution within a single process. A thread is a software construct that is contained within a process and that possesses a register set, a program counter and a stack. In a multi-threaded environment, each thread has its own set of registers, its own program counter and its own stack.

In the step indicated by the arrow 44 and box 114, the process monitor thread 40 makes an RPC call to the CCS 32 requesting initial context information about the client system. In response, the CCS 32 provides the requested information (box 116) which, for example, in the preferred embodiment includes the default directory, default volume and default natural language of the CCS 32. At this point, there resides within the compute server 22 sufficient information to produce the bound process 30.

In the step indicated by arrow 46 the monitor thread 40 creates the bound process by making a system call (box 118). The bound process 30 executes the application (box 120). During execution, the CCS 32 can, via RPC, control execution of the bound process 30, provide additional client system context or file data to the bound process when requested by the application program (boxes 122 and 123) and monitor termination of the bound process.

Figure 3:
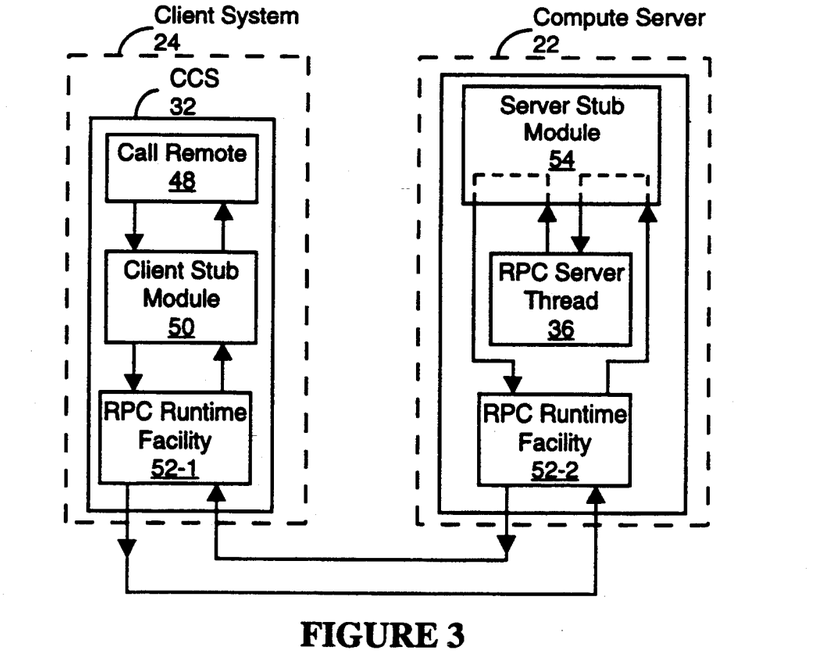
FIG. 3 is a flow diagram illustrating the steps in a Remote Procedure Call used in the computer network of FIG. 1.

The flow diagram of FIG. 3 shows the steps a Remote Procedure Call uses in a presently preferred embodiment of the invention. An RPC involves the invocation of a procedure in a different address space than that of the thread of the calling routine. For example, as explained above with regard to FIG. 2, the CCS 32 uses an RPC indicated by arrow 34 to call the RPC server thread 36. Similarly, the monitor thread 40 uses an RPC indicated by arrow 44 to obtain client system context information from the CCS 32. When a remote procedure is called, a calling routine, such as the CCS 32, is suspended, and parameters are passed across a communications medium, such as the network hardware and software 26 (FIG. 1), to a called routine thread 36, such as the RPC server thread. A desired procedure, such as the step of creating the monitor thread 40, as indicated by arrow 42, then is executed. An underlying run-time facility handles the passing of parameters and control between threads that communicate through such an RPC mechanism.

More particularly, referring to FIGS. 3, 5A and 5B, in the course of an RPC call by the CCS 32 to the RPC server thread 36, the CCS 32 calls a procedure 48 that resides in the client system 24. The call to procedure 48 results in a call to a client stub routine within a client stub module 50 (box 102).

In response to the call to the client stub module 50, the called client stub routine module packages the calling arguments into a canonical format (box 104). The arguments in the canonical format then are passed to the server program using the RPC run-time facility 52-1 and 52-2 (box 106).

The RPC run-time facility 52-2 on the server program 36 receives the arguments in the canonical format, processes the arguments and calls an appropriate server stub module 54 (box 108) which includes a server stub routine that unpacks the arguments packaged by the client stub routine. The server stub of the server stub module 54 places the arguments in a form that the RPC server thread 36 on the server system 22 can process (box 110).

In response to the calling arguments unpacked by the server stub, the RPC server thread 36 creates the monitor thread 40 by using a system call 42, as illustrated in FIG. 2 and box 112 in FIG. 5A.

After creating the monitor thread, the RPC server thread 36 passes status information back to the CCS 32 via a server stub in the server stub module 54, the RPC run-time facility 52-2 on the server side and the RPC run-time facility 52-1 on the client side. A client stub in the client stub module 50 on the client side receives the status information, unpacks it and places it in a form that can be processed by the CCS 32.

The RPC procedure just described is transparent to the calling procedure in the CCS 32. Thus, the CCS 32 can transparently (from the point of view of a user) create the RPC server thread 36 on the compute server 22. Similarly, the monitor thread 40 can use the RPC mechanism to obtain the initial context information required to create the bound process 30 on the compute server 22.

One skilled in the art will appreciate that the client stub module 50 and the server stub module 54 typically are a part of the operating environment in which an application program runs. They are created as part of the operating environment and are independent of the application program. A device known as a stub generator (not shown) defines the stub procedures to be accessed via the RPC. More specifically, a stub generator is used to produce respective client stubs in the client stub module 50 and respective server stubs in the server stub module 54.

Furthermore, it will be appreciated that server stubs in the server stub module 54 provide a standard program interface to an application program executing in the bound process 30 on the compute server 22. Moreover, the client stubs in the client module 50 provide a standard program interface to programs executing on the client system 24. Standard program interfaces include language run time services and other system services available to an application running on the client system 24. Thus, RPCs using the stub modules typically can be made in the same manner that standard program interfaces are used. Neither the developer of the application program nor the user of the client system 24 need be aware of the RPC interactions between the CCS 32 and the PCS 56. Consequently, such interactions are transparent both to the client system user and to the application program developer.

Figure 4:
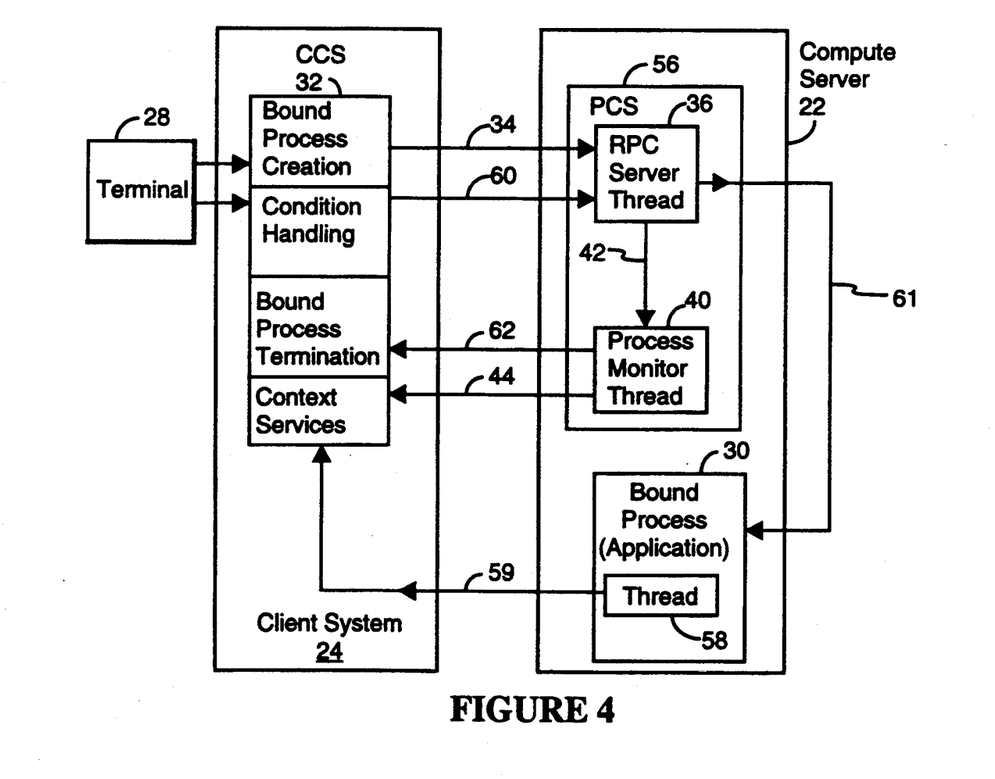
FIG. 4 is a block diagram illustrating the interface between the client system and the compute server of FIG. 1.

The illustrative block diagram of FIG. 4 shows the interface between the client context server 32 on the client system 24 and a process controller server 56 on the compute server. The process controller server 56 is a program that runs on the compute server and which includes the RPC server thread 36 and the monitor thread 40.

A user can issue commands through terminal 28. As explained above, the CCS 32 causes the RPC server thread 36 to produce the process monitor thread 40. The process monitor thread 40, in turn, communicates via RPC as indicated by arrow 44 with a Context Services portion of the CCS 32 in order to obtain the initial client context information for the bound process 30. A thread 58 in the bound process 30 achieves execution of the application program within the bound process 30. During execution of the application program within the bound process 30, the thread 58 can communicate via RPC, as indicated by arrow 59, with the Context Services portion of the CCS 32 to transparently obtain additional client context information as requested by the application. Such communication of additional client context information, for example, can include reading from a file that only exists on the client system 24.

During execution of the bound process 30, a user can exercise control over the execution via terminal 28 through the Condition Handling services of the CCS 32. The Condition Handling services handle exceptional program conditions such as a user's interrupting application program execution. In operation, a user, through terminal 28, can cause the Condition Handling services to provide an RPC call indicated by arrow 60 to the RPC server thread 36. The RPC server thread 36, in response, provides via standard system process control services a command indicated by arrow 61 to the bound process 30, for example, instructing the bound process to Stop, Debug, Suspend or Resume processing.

Meanwhile, the process monitor thread 40 monitors the execution of the bound process 30 and notifies the Bound Process Termination portion of the CCS 32 via RPC, as indicated by arrow 62 and boxes 124 and 125, when the bound process has terminated. It also provides exit status information to the CCS 32 via RPC as indicated by the arrow 44. Upon receiving exit status information, the CCS 32 exits, providing the exit status information to the user (box 126).

It will be appreciated that the novel compute server network 20 of the present invention advantageously can operate in a heterogeneous operating system environment in which each respective client system 24-1, 24-2 and 24-3 has a different operating system from the compute server 22 and from each other. Furthermore, the system 20 can engage in such operation while permitting each respective client system to transparently run respective applications within bound processes on the compute server 22. Thus, for example, referring to FIG. 1, a respective CCS on each of the client systems 24-1, 24-2 and 24-3 can use the RPC mechanism to transparently initiate and control separate bound processes running on the compute server 22.

More specifically, for example, referring to the illustrative drawing of FIG. 4, the thread 58 might request the transfer of context information indicating the natural language used by the user of the client system 24. The server 22 and the client system 24 can be running different operating systems. The bound process 30 operating on the compute server 22 using one operating system might request such information through a particular type of a procedure call germane to that operating system. The thread 58 through an RPC call to the context services of the CCS 32 indicated by arrow 59 would request the context information from the CCS 32 on the client system 24 specifying the user natural language. Through the RPC mechanism, the request, which began as a procedure call in one operating system on the compute server 22, would be translated into a procedure call on an operating system running on the client system 24 in terms understandable to that operating system. The actual language information then would be provided via RPC to the thread 58.

In a heterogeneous operating system environment, each of the client systems 24-1, 24-2, and 24-3 can seamlessly provide context information to the compute server 22 in a similar manner using the RPC mechanism. Thus, it will be appreciated that the network compute server system of the present invention advantageously permits a user to transparently initiate and control a computation intensive program on the compute server 22.

Furthermore, it will be appreciated that a bound process can run entirely on the compute server under transparent user control from a client system. Thus, network traffic between client and server is reduced, and the user need not even be aware that a program runs on the server.

RPC CALLBACK EMBODIMENT USING HELPER THREADS

Figure 6:
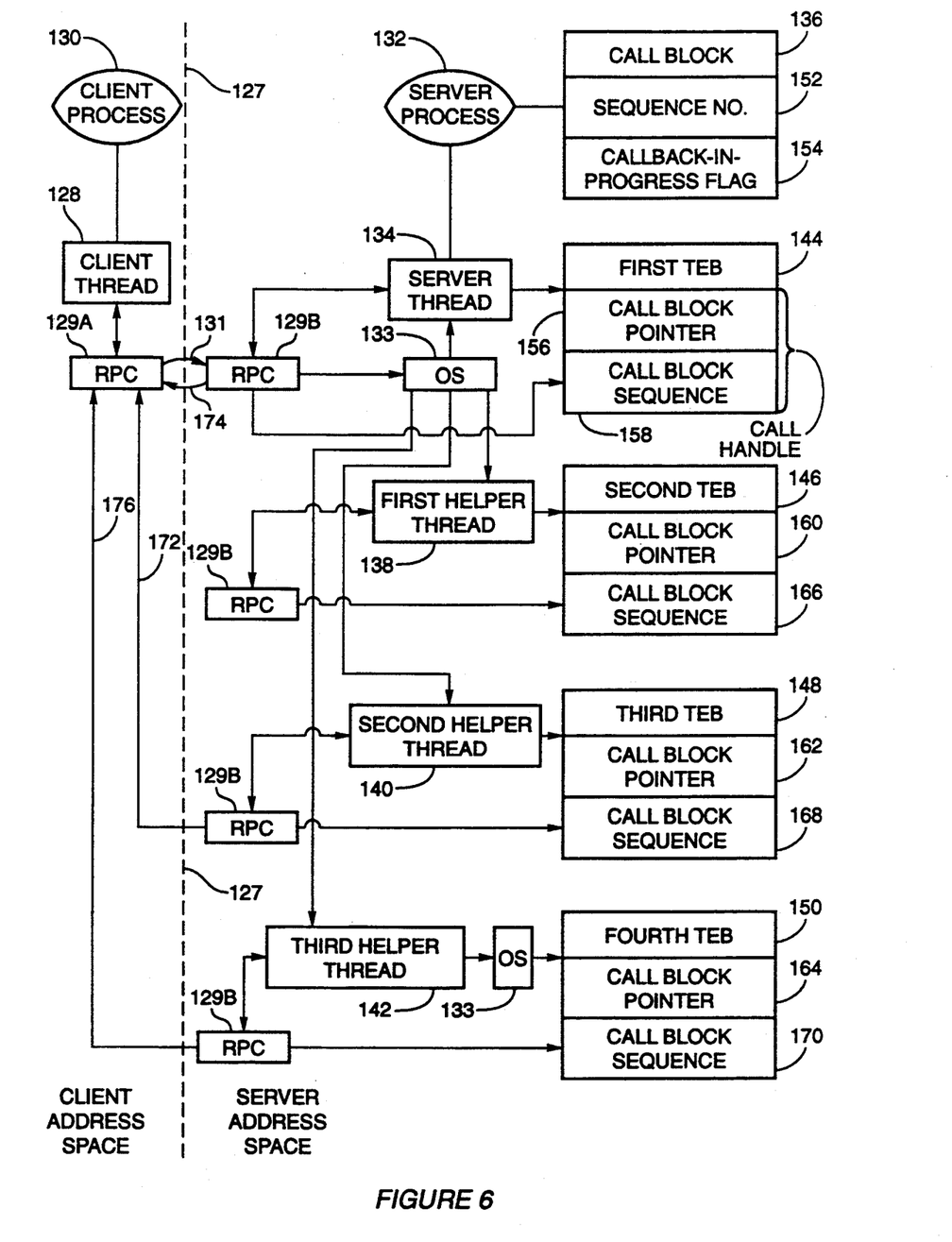
FIG. 6 is a block diagram of a data structure for a calling client thread and a called server thread in accordance with a second preferred embodiment of the invention.

Referring to the illustrative block diagram of FIG. 6, there is shown a data structure for performing callbacks from a helper thread in a multi-threaded environment to a calling client process. A calling client process 130 is located in a client address space illustrated to the left of dashed line 127. A called server process 132 is illustrated in a server address space shown to the right of dashed line 127. In a presently preferred embodiment of the invention, the client and server address spaces are virtual address spaces. It will be appreciated that the client and server address spaces can be located in different network entities such as one of the client systems and the server of FIG. 1; or they can both be located in a single entity such as the server of FIG. 1.

A calling client thread 128 in a client process 130 in the client address space uses an RPC mechanism 129 to make an RPC 131 to a server process 132 and thread 134 in a server address space. A Call Block 136 associated with the called server process 132 includes information that identifies the calling client thread 128. The Call Block 136 can be in the server Address space; or it can be in a different shared address space accessible to the called server thread 134 and its helper threads. First, second and third helper threads 138, 140 and 142 help the called server thread 134 to process the RPC from the calling client thread 128. The called server thread and each of the helper threads are associated respectively with Thread Execution Blocks (TEBs) 144, 146, 148 and 150. Each of the TEBs contains information that identifies the Call Block 136. The helper threads can all be in the server Address Space; or they can be in different address spaces (not shown) that share access to the address space containing the Call Block 136.

The TEBs are a form of thread-specific private storage that ordinarily is used to store thread-specific private information about the execution environment of the thread such as a user's natural language, for example. As explained more fully below, the respective TEBs advantageously can be directly accessed by the RPC mechanism 129 in the event that a thread makes an RPC callback to the calling client thread 128. By providing for each thread a corresponding TEB that contains thread-specific information regarding the Call Block 136 and the original RPC call to the server thread 134, the RPC mechanism is able to use substantially the same steps to service RPC callbacks from the called server thread 134 and from each of the helper threads. More particularly, the information stored in the TEBs can be used to identify the Call Block 136, and the Call Block can be used to identify the calling client thread 128.

During a callback to the calling client thread 128 by the called server thread or by any of the helper threads, an RPC mechanism 129, discussed more fully below, accesses the respective TEB of the thread requesting the callback. The RPC mechanism 129 uses the information in the respective accessed TEB to identify the Call Block 136. Information in the Call Block 136 then is used to identify the calling client thread 128. Thus, the RPC mechanism uses information in the TEBs to identify a calling client thread during a callback. Consequently, a thread requesting a callback need not explicitly pass information to the RPC mechanism in order to identify such a calling client thread.

Figure 7:
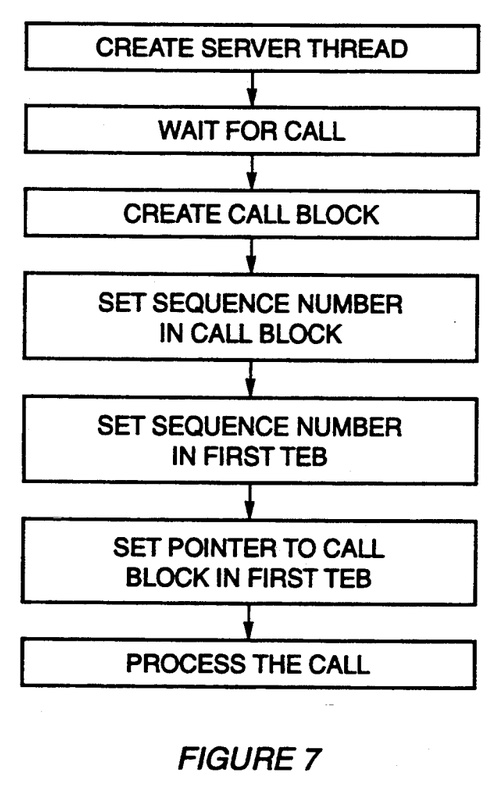
FIG. 7 is an illustrative flow diagram that shows the steps in making an RPC call using the data structure of FIG. 6.
Figure 8A:
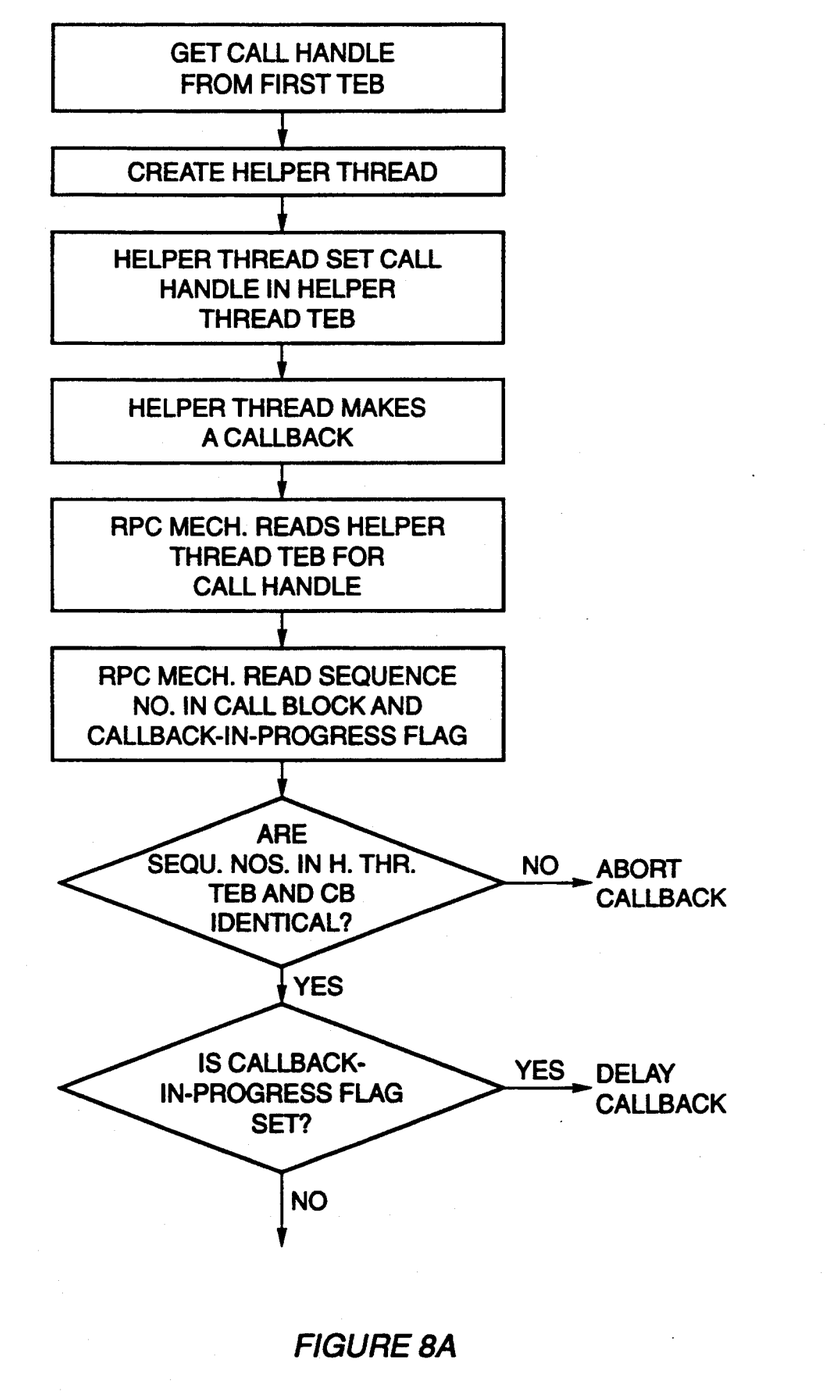
FIGS. 8A-B are illustrative flow diagrams that show the steps in making RPC callbacks using the data structure of FIG. 6.
Figure 8B:
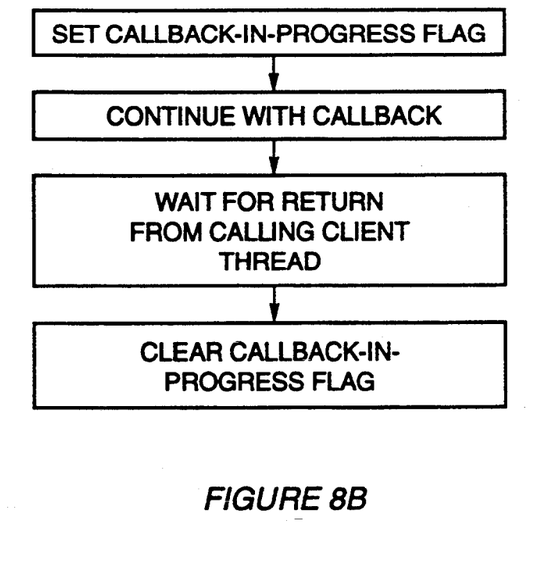

During the following description of the use of the illustrative data structure of FIG. 6, reference should be made to the illustrative Flow Diagrams of FIGS. 7 and 8A-B which provide flow diagrams that illustrate the steps in using the data structure. In particular, FIG. 7 illustrates the steps in making an RPC call, and FIGS. 8A-B illustrate the steps in making an RPC callback.

More specifically, when the calling server thread 128 in the server process 130 makes the RPC 131 through the RPC mechanism 129 to the server process 132, the server thread 134 is created. The RPC mechanism creates the Call Block 136 which stores information that identifies the location of the calling client thread 128. The Call Block 136 also stores a unique sequence number 152 that uniquely corresponds to the RPC call 131. Additionally, the Call Block stores a Callback-In-Progress Flag 154 used to indicate whether or not a callback is in progress.

In a presently preferred embodiment of the invention, multiple threads used to process the RPC 131 can simultaneously execute independently of each other. Thus, it is possible that one or more of the helper threads may request a callback after the called server thread 132 has completed processing the RPC call. This is undesirable because, for example, such a callback by a helper thread might corrupt data in the client address space. As explained below, the unique sequence number 152 stored in the Call Block 136 for RPC 131 is used to prevent the occurrence of such late callbacks.

Furthermore, it is possible that two or more threads such as the called server thread 134 and the second helper thread 140, for example, might contemporaneously request an RPC callback to the calling client thread 128. Such contemporaneous multiple callbacks are undesirable because the original calling client thread 129 may be busy. As explained below, the Callback-In-Progress Flag 154 is used to prevent the occurrence of such overlapping callbacks.

In the course of the call 131, the RPC mechanism 129 calls an operating system utility 133 that creates the server thread 134 and the first TEB 144. The RPC mechanism 129 stores in the first TEB a Call Block Pointer 136 and the Call Block sequence number 158. Together, the Call Block Pointer 156 and the sequence number 158 represent the "call handle" of the called server thread 134.

In the course of processing the RPC call from the calling client thread 128, for example, the server thread 134 may determine that it requires helper threads to assist in the processing of the original RPC call 131. The called server thread 134 makes calls to the RPC mechanism 129 which, in turn, calls the operating system utility 133. The operating system utility creates the first, second and third helper threads 138, 140 and 142, and the respective second, third and fourth TEBs 146, 148 and 150. The RPC mechanism 129 passes the call handle from the first TEB to the respective second, third and fourth TEBs. Thus, each of the TEBs includes a respective Call Block pointer 160, 162 and 164 that points to the Call Block 136 and includes a sequence number 166, 168 and 170 that is identical to the sequence number in the Call Block 136.

During the processing of the RPC 131 from the calling client thread 128, for example, the second helper thread 140 may invoke a callback 172 to the calling client thread 128 through the RPC mechanism 129. In the course of performing the callback 132, the RPC mechanism 129 accesses the third TEB 148 which is associated with the second helper thread 140. The Call Block pointer 162 is used by the RPC mechanism 129 to identify the Call Block 136. The RPC mechanism 129 compares the sequence number 154 in the Call Block 136 with the sequence number 166 in the second TEB 146. In this case, for example, they are identical. If the sequence numbers were not identical, then the callback would be precluded, and the RPC mechanism 129 would stop processing.

Since the sequence numbers do match, the RPC mechanism 129 observes the Callback-In-Progress Flag 154 in the Call Block 136 to ascertain whether another callback currently is in progress. At this point, no other callback is in progress. The RPC mechanism 129 sets the Callback-In-Progress Flag 154, and then proceeds in servicing the callback by the second helper thread 140 to the calling client thread 128. The second helper thread 140 then enters a wait state while it awaits processing of the callback 172 by the calling client thread 128.

While the second helper thread 140 is in the wait state, for example, the called server thread 134 requests an RPC callback 174 to the calling client thread 128 through the RPC mechanism 129. In response to the request, the RPC mechanism accesses the first TEB 144 to ascertain the Call Block pointer 156. The RPC mechanism 129 compares sequence number 158 to sequence number 152. In this case they are identical. The RPC mechanism then observes the Flag 154 which indicates that a callback 172 (by the second helper thread)is in progress. In response, the RPC mechanism delays the servicing of the callback by the called server thread 134 until the second helper thread 140 completes its callback. After the second helper thread 140 receives a return from the calling client thread 128 through the RPC mechanism 129, the RPC mechanism proceeds with the servicing of the callback invoked by the called server thread 134. Of course, during the processing of the callback by the calling client thread 128, the Flag 154 is set, and the called server thread 134 is in a wait state.

After completion of the RPC 131, the sequence number 152 in the Call Block 136 will be different from the sequence numbers in any of the TEBs 150. More particularly, after the called server thread 134 completes the processing of the RPC 131, and returns resulting information to the calling client thread 128, via the RPC mechanism 129, the RPC mechanism causes the sequence number 152 in the Call Block 136 to be changed to a new sequence number. In a presently preferred embodiment of the invention, the sequence number is set to all zeros upon completion of an RPC call by the called server thread 134. In the event that after the completion of the call 131, another calling client process (not shown) makes a new call (not shown) to another called server thread (not shown) that uses the same Call Block 136, the RPC mechanism 129 will cause a different unique sequence number to be loaded into the Call Block 136.

Subsequently, after the called server thread 134 has completed processing the RPC call 131 as explained above, for example, the third helper thread 142 may request the RPC mechanism 129 to perform a callback 176 to the client thread 128. In response to the request, the RPC mechanism 129 accesses the fourth TEB 150 and ascertains the Call Block pointer 164 to the Call Block 136. The RPC mechanism observes that the sequence number 170 in the fourth TEB does not match the sequence number in the Call Block 136. In response to the mismatch, the RPC mechanism prevents the requested callback.

The RPC mechanism shown in FIG. 3 includes a client RPC component in the client address space and a server component in the server address space. Referring back to FIG. 6, the second helper thread 138 can use the RPC mechanism of FIG. 3 to make a callback 172 to the calling client thread 128. Similarly, the called server thread 134 can use the RPC mechanism 129 to make a callback 174 to the calling client thread 128.

Referring to FIGS. 3 and 6, when a remote procedure is called, a calling thread, such as the calling client thread 128, is suspended, parameters are passed across a communications medium, such as the network hardware and software 26, to a called thread, such as the called server thread 134. A called procedure, in the server process 132, then is executed. An underlying RPC run-time facility 52-1, 52-2 handles the passing of parameters and control between threads that communicate through such an RPC mechanism.

More particularly, referring once again to FIG. 6, for example, in the course of an RPC call by the calling client thread 128 to the called server thread 134, the calling client thread 128 calls a procedure 48 that resides in the client address space. The call to procedure 48 results in a call to a client stub routine within a client stub module 50.

In response to the call to the client stub module 50, the called client stub routine packages the calling arguments into a canonical format. The arguments in the canonical format then are passed to the server program using the RPC run-time facility 52-1 and 52-2.

It will be understood that a canonical format is merely one of numerous possible formats that can be used to transfer arguments. Alternative formats, for example, can be agreed upon by the client process 130 and the server process 132 using the RPC Run-Time Facility 52-1, 52-2 to carry out the agreement.

The RPC run-time facility 52-2 in the server address space receives the arguments in the canonical format, processes the arguments and calls an appropriate server stub module 54 which includes a server stub routine that unpacks the arguments packaged by the client stub routine. The server stub of the server stub module 54 places the arguments in a form that the called server thread 36 in the server address space can process.

In response to the calling arguments unpacked by the server stub, the RPC server thread 36 produces the first, second and third helper threads 138, 140 and 142 described above.

During the callbacks described above for the second helper thread 140, for example, information is transported to the calling client thread 128 via a server stub in the server stub module 54, the RPC run-time facility 52-2 in the server address space and the RPC run-time facility 52-1 in the client address space. A client stub in the client stub module 50 on the client side receives the information, unpacks it and places it in a form that can be processed by the calling client thread 128.

One skilled in the art will appreciate that the client stub module 50 and the server stub module 54 typically are a part of the operating environment in which an application program runs and are independent of the application program. A device known as a stub generator (not shown) defines the stub procedures to be accessed via the RPC. More specifically, a stub generator is used to produce respective client stubs in the client stub module 50 and respective server stubs in the server stub module 54.

Furthermore, it will be understood that stub modules are convenient mechanisms that permit a software programmer to write a call without the need to understand details of the underlying run-time facilities. The stub modules package and unpackage arguments. Alternatively, an RPC call or an RPC callback could be made in which the call or callback was made directly to the RPC run-time facilities without using stub modules.

Moreover, instead of using thread-specific TEBs to store call handles, alternative thread-specific private storage could be used to store the call handles. In using such alternate thread-specific private storage, the RPC mechanism 129 would access such alternative storage during callbacks to locate the calling client thread 128.

Thus, while the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. In a computer system including a client system in a client address space, a compute server in a server address space, and means for transporting messages between the client system and the compute server; a method performed by said computer system for processing a remote procedure call by the client system to the compute server, comprising the steps of:
   transporting the remote procedure call from the client system to the compute server;
   said compute server initiating processing of said remote procedure call by the compute server and determining that additional information is needed from the client system to process the remote procedure call;
   said compute server initiating a remote procedure callback to said client system to request said additional information;
   transporting the remote procedure callback to said client system; and
   said client system receiving and processing said remote procedure callback and returning said additional information to said compute server.

2. In a computer system including a client thread in a client address space, a server thread in a server address space, and means for transporting messages between the client thread and the server thread; a method performed by said computer system for processing a remote procedure call by the client thread to the server thread, comprising the steps of:
   transporting the remote procedure call from the client thread to the server thread;
   said server thread initiating processing of said remote procedure call by the server thread and determining that additional information is needed from the client thread to process the remote procedure call;

said server thread initiating a remote procedure callback to said client thread to request said additional information;

transporting the remote procedure callback to said client thread; and said client thread receiving and processing said remote procedure callback and returning said additional information to said server thread.

3. A computer network, comprising:

a compute server;

a client system having means for initiating a remote procedure call to said compute server;

means for transporting messages, including said remote procedure call and any results therefrom, between the client system and the compute server;

said compute server including means for receiving and processing said remote procedure call, and for determining that additional information is needed from the client system to process the remote procedure call; said compute server further including means for initiating a remote procedure callback to said client system to request said additional information; and said client system including means for receiving and processing said remote procedure callback and for returning said additional information to said compute server.

4. A computer system comprising:

a server thread in a server address space, a client thread in a client address space, said client thread having means for initiating a remote procedure call to said server thread;

means for transporting messages, including said remote procedure call and any results therefrom, between the client thread and the server thread;

said server thread further including means for receiving and processing said remote procedure call, and for determining that additional information is needed from the client thread to process the remote procedure call; said server thread further including means for initiating a remote procedure callback to said client thread to request said additional information; and said client thread including means for receiving and processing said remote procedure callback and for returning said additional information to said server thread.

* * * * *